United States Patent

Antunes et al.

[11] Patent Number: 5,414,731
[45] Date of Patent: May 9, 1995

[54] COMMAND SET AND PROCEDURE FOR SYNCHRONIZATION OF FREQUENCY HOPPING CONTROL CLOCKS

[75] Inventors: Ernesto Antunes, Campinas - SP, Brazil; David F. Bantz, Chappaqua, N.Y.; Frederic J. Bauchot, Saint-Jeannet, France; Eliane D. Bello; Marcelo Ferraz, both of Campinas - SP, Brazil; Francois LeMaut, Nice, France; Bernardo da Silva Araujo Tavares, Sao Catano do Sul - SP, Brazil

[73] Assignee: International Business Machines Corporation, Armonk, N.Y.

[21] Appl. No.: 210,824

[22] Filed: Mar. 18, 1994

[51] Int. Cl.⁶ ............................................. H04L 27/30
[52] U.S. Cl. ....................................... 375/202; 380/34
[58] Field of Search ................................ 375/1; 380/34

[56] References Cited

U.S. PATENT DOCUMENTS

| | | | |
|---|---|---|---|
| 4,023,103 | 5/1977 | Malm | 455/62 |
| 4,558,453 | 12/1985 | Mimken | 375/1 |
| 4,677,617 | 6/1987 | O'Connor | 370/50 |
| 4,850,036 | 7/1989 | Smith | 455/51.1 |
| 5,130,987 | 7/1992 | Flammer | 375/1 X |
| 5,140,610 | 8/1992 | Holliday et al. | 375/1 |

*Primary Examiner*—Bernarr E. Gregory
*Attorney, Agent, or Firm*—Perman & Green

[57] ABSTRACT

A wireless Local Area Network (LAN), in which each wireless adapter includes a controller and a transceiver which are located a finite distance from each other. Each controller and transceiver has their own hop clock and hop table. A data interface which includes a command set is defined between the controller and the transceiver. The command set includes commands and procedures for synchronizing the hop clocks and hop tables between the controller and the transceiver.

11 Claims, 4 Drawing Sheets

FIG. 1.
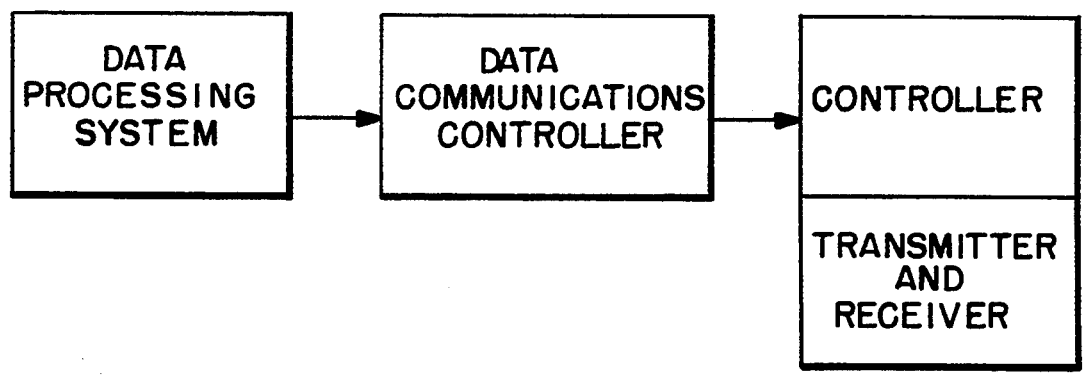
FIG. 2.
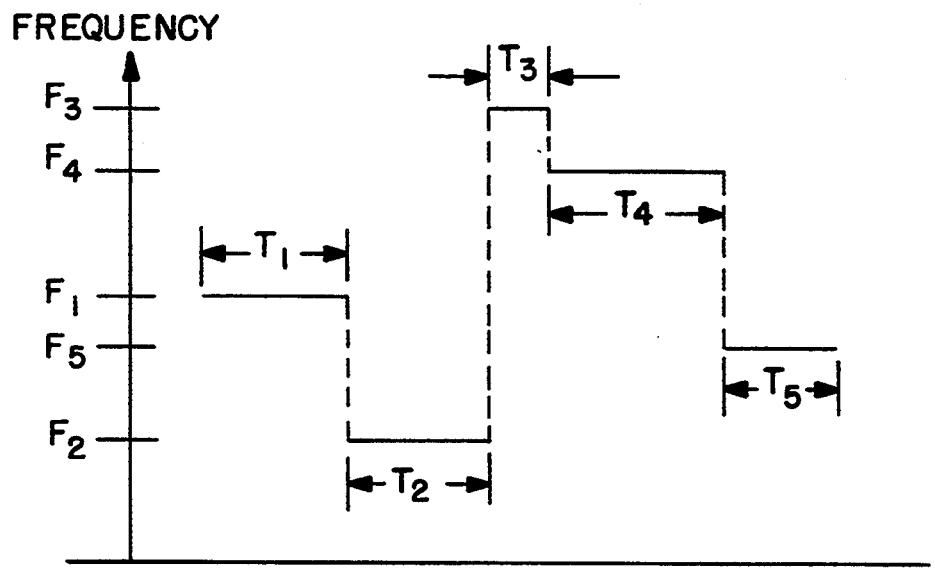
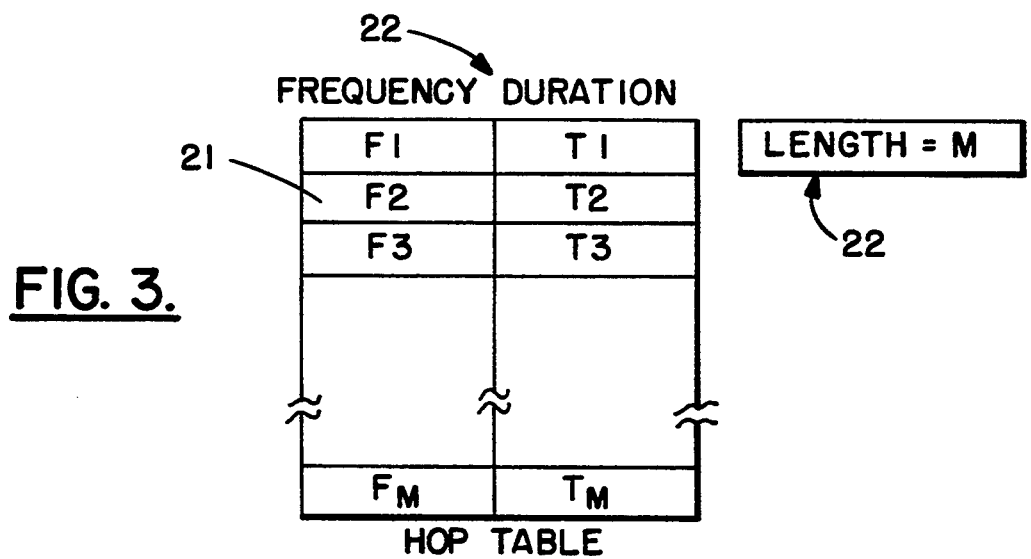
FIG. 3.

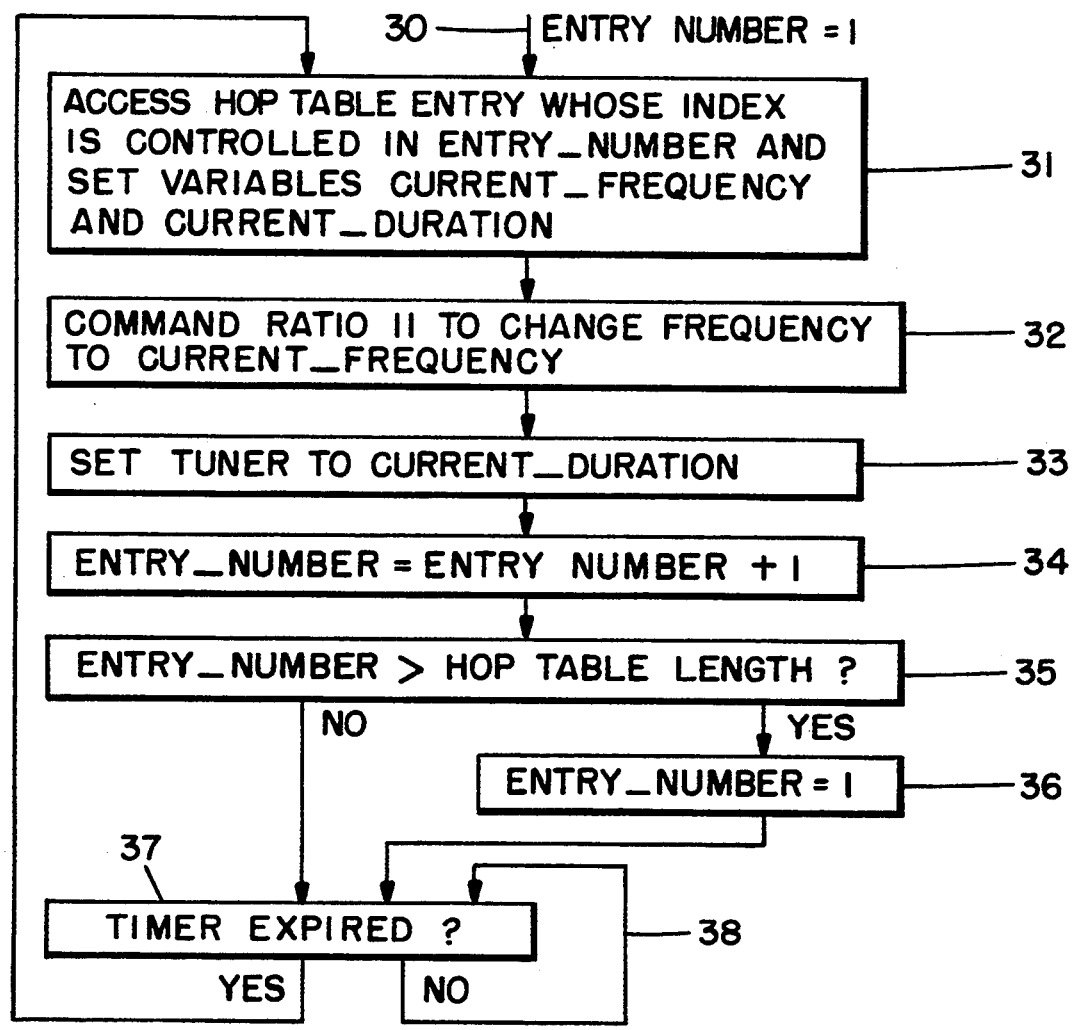
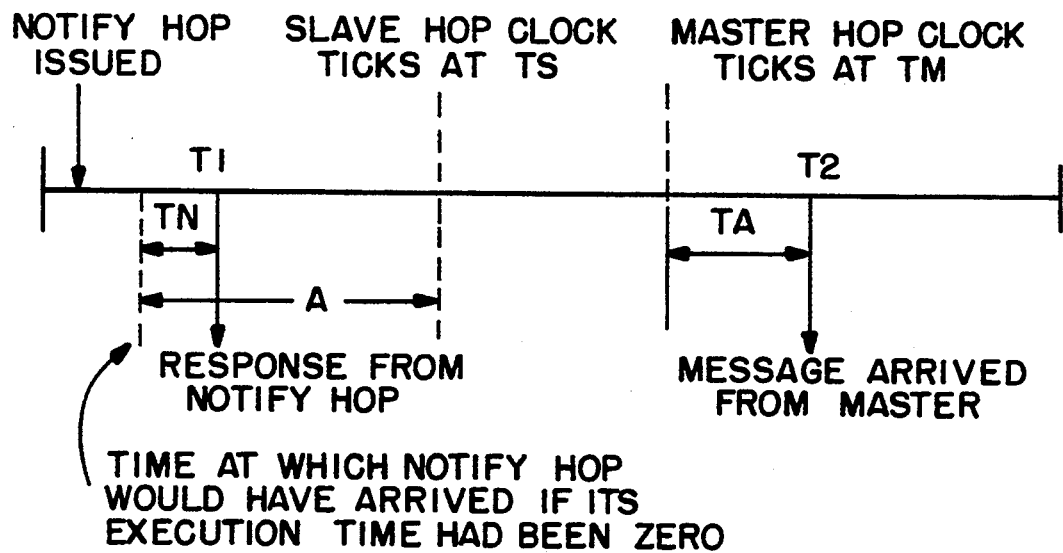

COMMAND SET AND PROCEDURE FOR SYNCHRONIZATION OF FREQUENCY HOPPING CONTROL CLOCKS

FIELD OF THE INVENTION

This invention relates generally to data communications systems and in particular clock synchronization in such systems. Specifically, the invention is directed to synchronization of clocks used for frequency control in slow frequency-hopping spread-spectrum radio systems.

Background of the Invention

Radio systems designed to operate in the slow-frequency-hopping spread-spectrum mode periodically change their operating frequency. The precise instants that these frequency changes occur are controlled by an internal clock, referred to herein as the "hop clock." In order for a receiver to receive signals from a transmitter, the hop clocks in the receiver and in the transmitter must be in precise synchronism, and both the receiver and the transmitter must use the same sequence of operating frequencies.

There are a number of patents related to clock synchronization in frequency-hopping systems, each of which has certain advantages and disadvantages.

U.S. Pat. No. 4,023,103 to Malm discloses a receiver of a fast frequency hopping (FFH) system which is synchronized with a sending transmitter in three phases from a starting condition where the frequency hopping local signal leads the received signal prior to synchronization. During the first phase, the difference frequency of a frequency hopping received signal and the frequency hopping local signal is monitored for IF during each FFH period. The FFH periods are grouped; when there is IF however, until this condition is met, the local frequency is set back one FFH period for each group of periods. Then in the next phase, the IF in the two halves of each FFH period is compared to ascertain whether more of the leading half or more of the trailing half of each FFH period has the IF and the phase of the local signal is adjusted until the phase difference between the frequency hopping local signal and the frequency hopping received signal is less than a predetermined minor fraction of an FFH period. Then in the following phase, two additional local signals, the same as, the one local signal but phase advanced and phase retarded, respectively, by the same minor fraction of an FFH period, are separately mixed with the received signal and the differences compared; the phase of the local signal is finely adjusted to substantially equalize the IF obtained from the two signals. A fourth phase similar to the preceding phase can be added for still finer adjustment.

U.S. Pat. No. 5,140,610 to Holliday et al discloses a video data link system which utilizes spread spectrum to decrease the susceptibility of a low power video link to radio frequency countermeasures. The video data link system utilizes a combination of spread spectrum direct-sequence modulation and frequency-hopping along with frequency modulation to provide spectral spreading of radio frequency energy to a bandwidth much greater than the information bandwidth. The direct sequence modulation allows minimization of the number of frequency steps required for complete spectral filling of the operational bandwidth on an average basis. Frequency hop timing is determined from the phase of the direct sequence generator to simplify the frequency hop synchronization process in the receiver. Bandwidth of the fm video signal, after being spread in spectral width by the bi-phase direct sequence signal, is approximately equal to the direct pseudo random sequence clock rate. Spacing of the frequency hop step is matched to the direct sequence bandwidth to relate each frequency stepped subcarrier harmonically to the fundamental sequence clock, thereby allowing simpler generation of de-hop subcarriers in the receiver.

U.S. Pat. No. 4,850,036 to Smith discloses a frequency-hopping radio communication system which comprises a control unit which transmits to and receives from each of a plurality of slave stations using a frequency-hopping mode of operation. During a start-up mode, the control unit communicates a starting message to each slave station using a predefined frequency. The message identifies to each slave station a frequency-hopping sequence to be used to select the frequencies from a group of frequencies for transmission to and reception from the control unit. This message also specifies to each slave station unique starting frequencies in the frequency-hopping sequence at which to begin transmitting and receiving. All slave station transmissions are synchronized to the control unit transmissions, thereby preventing any two stations from concurrently using the same frequencies for either transmitting to or receiving from the control unit.

U.S. Pat. No. 4,558,453 to Mimken discloses a frequency hopping radio frequency communication system and method in which keying at Time $T_1$ of a transmitter (Tx) automatically initiates the transmission of a predetermined number of cycles ($C_1$-$C_s$) of a sync acquisition signal (W,X,Y and Z) at each of a number of different frequencies (A–G). The receiver (Rx) is being tuned through the same frequencies (A–G) at a relatively slower rate so that the sync acquisition signal is received at each of the receiver frequencies. Upon recognition of the sync acquisition signal and the cycle in which it is received, the receiver anticipates the end of the last cycle of the sync acquisition signal in synchronism with the transmitter and initiates tuning of the transmitter and receiver in accordance with a predetermined pseudorandom code. Additionally, a synchronization maintenance signal is sent approximately every ten seconds to insure that the synchronization between both radios is precisely maintained. Upon termination of a transmission, an "end of message" signal is sent. Depending upon the radio mode selected, both radios will either simultaneously return to the "search" or acquisition mode, in which case resynchronization is required each time the transmitter is keyed, or in which synchronism is retained for a predetermined time ($T_f$-$T_5$ and $T_6$-$T_7$) following transmission to permit receipt of an answer without the necessity of reestablishing synchronism.

U.S. Pat. No. 4,677,617 to O'Connor et al discloses a method for synchronizing the operation of frequency hopping, spread spectrum communication devices in a network. One device (the "NTU") is deemed to be keeping the network time, to which the other devices must synchronize in order to communicate over the network. In a broadcast mode of the method an unsynchronized unit (a "RTU") operates in an idle state to receive on a discrete set of receive frequencies. The total communication time period is divided into intervals, and a unique synchronization code is generated for each time interval which defines the idle state frequencies and the information transmit frequencies to be employed in accordance with the method. The time kept by the RTU is assumed to be within a predetermined number of time intervals of the present network time interval. In a broadcast mode the NTU transmits sequences of synchronization messages, each sequence including a message transmitted at a receive frequency for each of the past, present and future time intervals necessary to cover the time uncertainty time. This sequence is transmitted at a transmit hop rate substantially higher than the RTU receive hop rate, so that all possible receive frequencies and synchronization codes are bracketed by the transmission sequence. Each message includes information enabling the RTU to predict the time and frequency at which network time information will be transmitted by the NTU. The RTU receives one of the messages and tunes to the appropriate receive frequency to receive information enabling it to synchronize to the network time.

According to the present invention, in a wireless adapter there is a controller and a radio which are separated by a finite distance. Each includes a hop clock and a hop table. A data communications interface is defined between the controller and the radio which includes a command set for synchronizing the respective hop clocks and hop tables.

It is advantageous to have hop clocks in both the controller and in the radio to minimize the cost of the data communications interface and to ensure that the quality of the hop clock signals is not compromised by noise present on the interface.

DISCLOSURE OF THE INVENTION

A wireless Local Area Network (LAN) is disclosed herein in which each wireless adapter includes a controller and a transceiver which are located a finite distance from each other. Each controller and transceiver have their own hop clock and hop table. A data interface which includes a command set is defined between the controller and the transceiver. The command set includes commands and procedures for synchronizing the hop clocks and hop tables between the controller and the transceiver.

BRIEF DESCRIPTION OF THE DRAWINGS

FIG. 1 is a block diagram of a data processing system which utilizes a command set for synchronizing hop clocks according to the invention;

FIG. 2 is a diagram illustrating a particular instance of the use of radio carrier frequencies by a slow frequency-hopping system for five successive hopping intervals;

FIG. 3 is a table illustrating the data structure by which the radio controller may change the radio carrier frequency autonomously;

FIG. 4 is a flowchart of the hop table interpretation in the radio controller;

FIGS. 6A and 6B are detailed diagrams of the timing for synchronizing the hop clocks.

DETAILED DESCRIPTION OF THE PREFERRED EMBODIMENT

Figure 5:
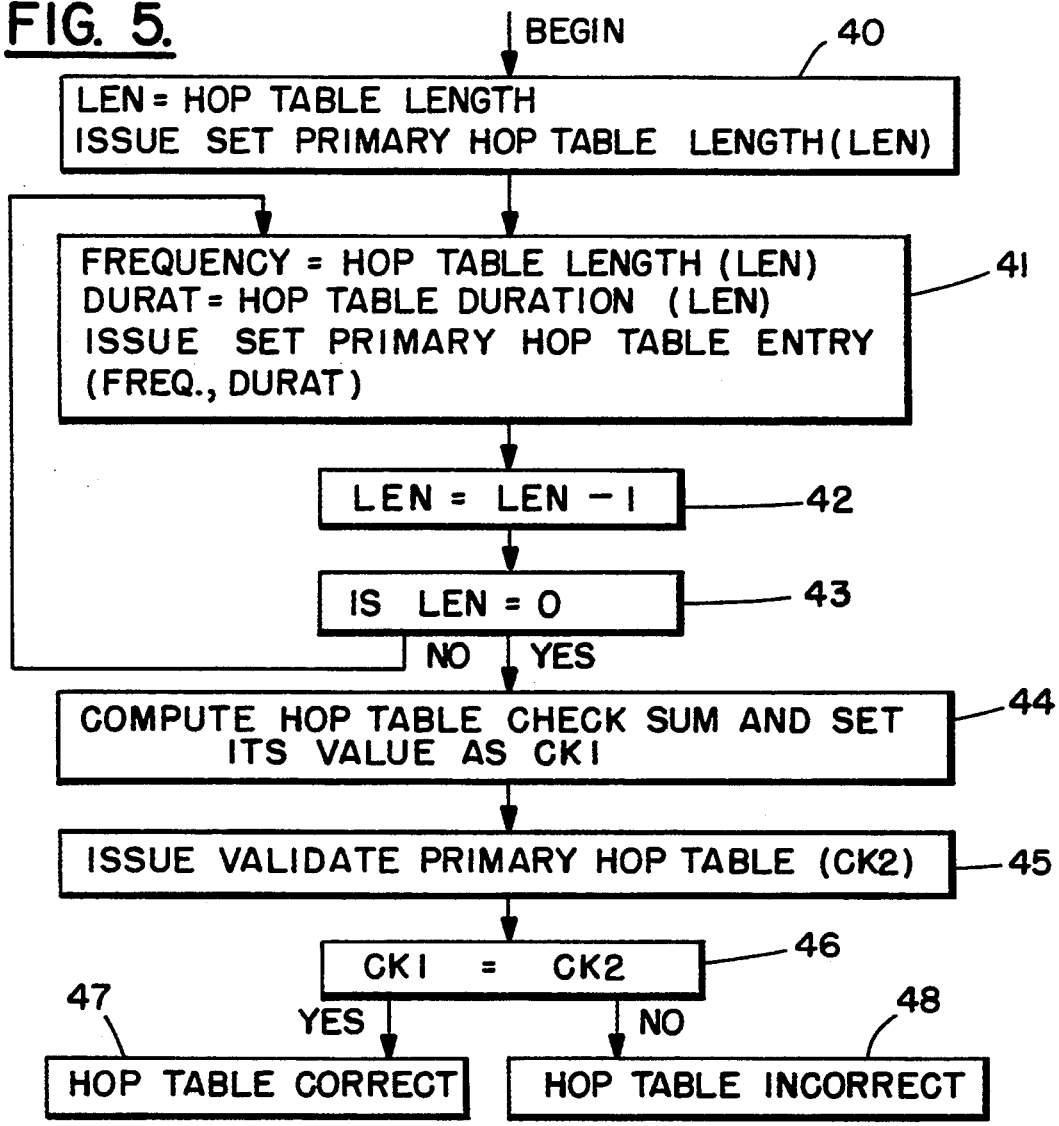
FIG. 5 is a flowchart of the procedure for creation of the primary hop table.

The data communications system, as illustrated in FIG. 1, consists of a data processing system 1 connected to a data communications controller 3 by an interface 2, with the controller 3 being connected to a radio 5 by an interface 4. The radio 5 includes two elements; a radio controller 10 and a radio transmitter and receiver 11. The radio controller 10 exercises detailed control over the radio transmitter and receiver 11 through a control interface which is not shown. Such a control interface consist of, for example, turning on and off the transmitter and most particularly control of the carrier frequency of the transmitter and the listening radio frequency of the receiver.

The functions of the data communications system illustrated in FIG. 1 are partitioned among its elements. The radio 5 is responsible for converting data received by it on interface 4 to a form suitable for transmission using radio signals at a particular carrier frequency, and for sensing radio signals at a particular carrier frequency, recovering their data content, and sending that data on interface 4 to the data communications controller 3. The radio is not generally capable of interpreting the data it receives or transmits. The actions of sending and receiving radio signals may be concurrent, as in full-duplex operation, or may be exclusive in time, as in half-duplex operation.

The data communications controller 3 is responsible for formatting the data to be transmitted and for extracting and interpreting certain information from received data. The data communications controller 3 is also responsible for exercising general control over the radio 5 by determining certain parameters of radio system operation, either independently or by extracting these parameters from data received from the radio 5. These certain parameters are transmitted to the radio 5 on interface 4. The data communications controller 3 is additionally responsible for communicating data to and from the data processing system 1.

The data processing system 1 is responsible for originating data and transmitting it to the data communications controller 3 on interface 2, and for processing data received from the data communications controller 3 over interface 2.

The invention specifically concerns the means by which control of the radio frequency of the radio transmitter and receiver 11 is exercised. More particularly, this control determines a sequence of operating radio frequencies and their durations, appropriate to a mode of radio operation known in the radio art as "slow frequency-hopping." This mode of operation is described in the book Spread Spectrum Communications by Cooper and McGillem, published by McGraw-Hill for example. A particular instance of use of this mode of operation is regulated by part 15,247 of the regulations of the United States Federal Communications Commission.

FIG. 2 illustrates a particular instance of the use of radio carrier frequencies by a slow frequency-hopping system. The use is shown for five successive hopping intervals: T1, T2, T3, T4 and T5. Carrier frequency F1 is used during T1, F2 during T2, and so forth. There is no restriction that the successive intervals T1–T5 be equal in duration. The period of time during which the carrier frequency is constant is called a "hop."

The invention relates specifically to the specification and control of the use of radio carrier frequencies for slow frequency-hopping as shown in FIG. 2. One method for control of the carrier frequency is for the data communication controller 3 to change the radio carrier frequency by sending a SET CHANNEL IMMEDIATE command to the radio controller 10. The SET CHANNEL IMMEDIATE command causes the radio controller 10 to change the carrier frequency (hopping frequency) of the radio to a new frequency. The use of a READ TIMINGS command can determine the execution time of the SET CHANNEL IMMEDIATE command so that it can be issued early, resulting in frequency change ("hopping") at the appropriate time. This early issuing is discussed in more detail later.

The direct specification of radio carrier frequency by the data communications controller 3 may not be feasible because of the variable and unpredictable demands on the processing resource of the data communications controller 3, leading to variability in the time at which the SET CHANNEL IMMEDIATE command is issued. This variability, in turn, may lead to unwanted variability in the duration and time of initiation of a hop. Consequently it is desirable that the radio controller 10 be able to change the radio carrier frequency autonomously under the control of a data structure as shown in FIG. 3. This data structure has two components: a hop table 20 and its length 22. Also shown is a hop table entry 21 consisting of a specification of a radio carrier frequency and its associated duration. The ordering of the hop table entries is significant because it specifies the order of use of these entries: F1 is used for T1, immediately followed by F2 for T2, and so forth.

A hop table 20 and its associated length 22 conveniently describes one of the important parameters of radio system operation. It is convenient for a hop table to be maintained within the radio controller 10 so that delays in communicating information between the data communications controller 3 and the radio controller 10 using interface 4 do not affect the duration of a hop. As previously noted, the placement of the hop table in the radio controller 10 also obviates potential variability in the time of initiation of the SET CHANNEL IMMEDIATE command. The placement of the hop table and its associated length in the radio controller 10 implies the need for the execution of a procedure called "hop table interpretation" in the radio controller 10. A flowchart describing this procedure is illustrated in FIG. 4.

With reference to FIG. 4, hop table interpretation requires a variable ENTRY NUMBER 30 whose value is the index of the hop table entry specifying the current hop. Use is made of two additional variables, CURRENTFREQUENCY and CURRENTDURATION, which are copies of fields of the current hop table 20 entry. These variables are not essential to the procedure but clarify the exposition.

Hop table interpretation is a never-ending cyclical process. It begins with access to the current hop table 20 entry, and the copying of its fields to the CURRENTFREQUENCY and CURRENTDURATION variables as shown at block 31. These variables are used immediately to change the carrier frequency of the radio at block 32. This change is known as "hopping." A timer is then set to the CURRENT DURATION at block 33. The timer is a hardware resource of the radio controller 10 that is incremented or more commonly decremented periodically by a hardware clock signal. For example, the National Semiconductor HPC46400E microprocessor implements several timers. Once the timer has been set, the procedure of FIG. 4 continues by updating the value of the ENTRYNUMBER variable at block 34. At block 35, a determination is made whether or not the ENTRYNUMBER is greater than the hop table length (the last entry). If the current hop table entry was the last in the table, the current hop table entry must be set to the first entry in the table at block 36. The procedure then waits until the timer expires at block 37, by a loop-back at 38. When the timer expires, a return is made to block 31, and the hop table interpretation procedure repeats.

The flow chart of FIG. 4 shows that the procedure waits actively for timer expiration by repetitively testing its value. Alternatively, the timer could be arranged to generate an interrupt signal, permitting other processing while the hop table interpretation procedure is suspended. When the timer expires an interrupt occurs and the procedure of FIG. 4 continues with the access to the current hop table entry, the step identified at block 31.

Because the hop table determines the critical operating parameters for the radio transmitter, special care must be taken to ensure that it is correct. Two types of checks can be performed: one to ensure that the hop table was correctly received by the radio controller 10, and the other to validate the hop table against the rules and regulations of the local authority. An example of the kinds of checks required to do this validation includes:

- check each frequency to see that it lies in the allocated band
- check each duration to see that it is neither too short nor too long
- check the sum of all durations to see that the sum is neither too short nor too long
- check the list of frequencies to see if any frequency appears more than once, or if any frequency is omitted It may also be of value for more than one hop table to be defined. If the radio is being used in a multi-cellular environment, where the desired hopping behavior of the radio is a function of what cell the radio is currently in, and if cell transitions may be rapid, then the ability to switch from one hop table to another without the overhead of constructing and validating a new hop table may be of value.

The subject invention consists partially of a command set whose purpose is the construction, modification, and validation of hop tables. These commands are issued by the data communication controller 3, communicated on interface 4, and obeyed by the radio controller 10. Three commands relevant to this purpose are listed and described below.

SET PRIMARY/SECONDARY HOP TABLE ENTRY (entry number, frequency, duration)

This command causes the radio controller to write over the contents of the designated hop table entry in the designated hop table with a new frequency and duration.

SET PRIMARY/SECONDARY HOP TABLE LENGTH (length)

This command causes the length of the designated hop table to be set.

VALIDATE PRIMARY/SECONDARY HOP TABLE (checksum)

This command causes the radio controller 10 to compute a checksum, from the contents of the designated hop table and its length, and to return the value of that checksum to the data communication controller 3. The computation of a checksum is a technique known in the art.

The SET PRIMARY/SECONDARY HOP TABLE ENTRY command can be used to create or update one of two hop tables, called the "primary" and "secondary" hop tables. Each instance of use of the command causes one hop table entry to be defined or updated. The SET PRIMARY/SECONDARY HOP TABLE LENGTH command causes the length field associated with the designated hop table to be set, and the VALIDATE PRIMARY/SECONDARY HOP TABLE command causes a checksum computation to be performed. A checksum calculation can be as simple as an arithmetic sum of the hop table entries and the length. Although the three commands permit only two hop tables to be created, modified, and/or validated, the extension to more than two hop tables follows from the above description.

FIG. 5 is a flowchart describing a procedure for the creation of a primary hop table, using the just described three commands. A hop table (HOPTABLE) is assumed to have been created in the data communications controller 3 by means not shown. Typical means include the retrieval of a hop table from nonvolatile storage in the data processing system 1 and its transmission to the data communications controller 3 using interface 2.

In the flowchart of FIG. 5, the auxiliary variables LEN, FREQ, DURAT, CK1, and CK2 are used. The notation is as in the programming language C, described in a book "The C Programming Language" by Kernighan and Ritchie, Prentice-Hall pubs. At block 40, the hop table length is set first, then the last hop table entry is set from the HOP TABLE at block 41. The hop table index LEN is then updated at block 42 and tested at block 43, and the procedure repeats by returning to block 41 if not all of the hop table entries have been used. If all of the hop table entries have been used, the checksum of the HOPTABLE is computed and saved as CK1 at block 44. A signal VALIDATE PRIMARY HOP TABLE (CK2) is then issued at block 45 to cause the radio controller 10 to compute the checksum of its hop table and return its value on interface 4. The data communications controller 3 captures this value as the value of CK2. The two checksums CK1 and CK2 are then tested at block 46 to determine if they are equal. If the two checksums CK1 and CK2 are equal the hop table was received correctly by the radio controller 10 as shown at block 47. If they are not correctly received, this is indicated at block 48.

Figure 7:
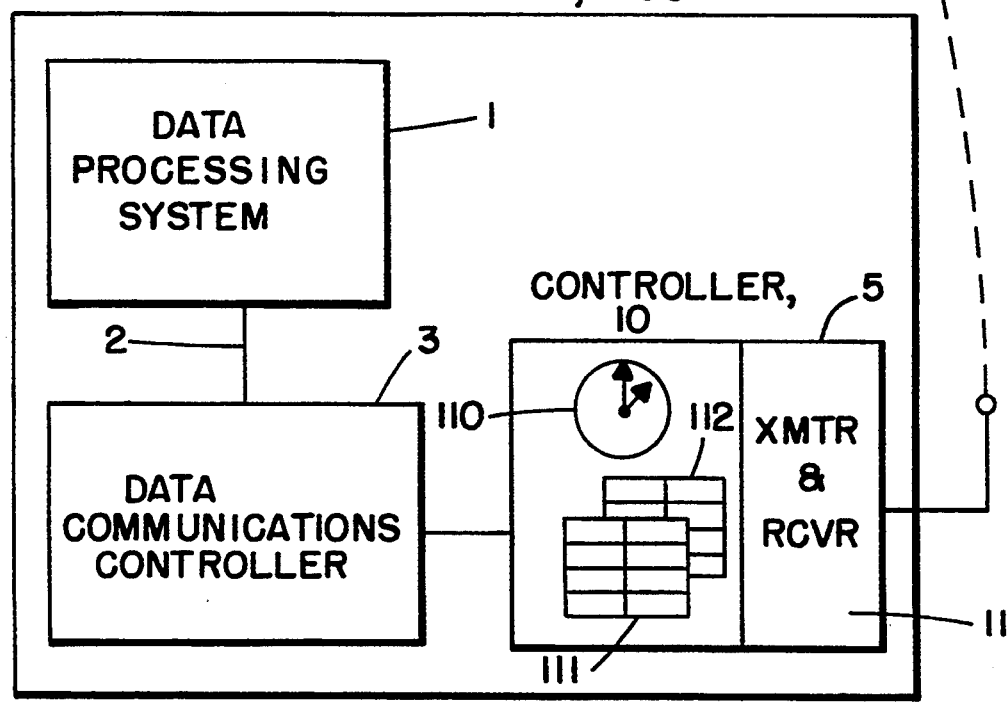
FIG. 7 is a schematic block diagram illustrating the relationship between a master station and a slave station.

FIG. 7 is a schematic block diagram illustrating the relationship between a master station 120 and a slave station 130, where the frequency-hopping behavior of all slave stations wishing to communicate with the master station is coordinated by the master station. In particular, the hop clocks 110 of all the master station, and the active hop table (either primary 111 or secondary 112) of all slave stations must be identical to that of the master station (either primary 101 or secondary 102). First is will be described how the hop tables of slave stations come to be identical to those of the master station, and subsequently how the hop clocks of slave stations come to be in synchronism with that of the master station.

Several techniques may be employed to ensure that the hop tables of slave stations are identical to those of the master station. One technique is to initialize the hop tables of slave stations at the time they become members of the system: prior to their first use with a designated master station. This initialization can be performed by loading the slave station's data processing system 1 with replicas of the master station's primary and secondary hop tables through means not shown, and communicating these replicas through interface 2 to the data communications controller 3 of the slave station. The primary 111 and secondary 112 hop tables are then communicated from the data communications controller 3 to the controller 10 using the procedure given in FIG. 5.

It is not necessary that both the primary hop table 110 and secondary hop table 111 of slave stations be initialized. Only one of these tables, say the primary table, need be initialized. Given that communications between the master station 120 and slave stations 130 can be established, the data processing system of the master station can originate a new hop table, say the secondary hop table 102, either through computation or through communications means not shown. The data processing system of the master station 120 can then originate a sequence of messages to each slave station 130 to build a replica of the secondary hop table 102 in the memory of the slave station data processing system 1. Communications protocols to accomplish this communication are known to those skilled in the art. Once a replica of the master station secondary hop table 102 has been built in the memory of the slave station data processing system 1, it can be communicated to its data processing controller 3 over interface 2, and the data processing controller 3 can use the procedure of FIG. 5 to build the secondary hop table 112 in its controller 10.

Given that the slave station 130 has identical copies of the master station's hop tables 101 and 102, it may be desirable for the master station to change its frequency-hopping pattern, for example to avoid using frequencies that have been found to be contaminated with interfering energy. The switchover from one frequency-hopping pattern to another must be accomplished simultaneously in the master station 120 and in all slave stations 130. Further, this switchover may be required to be so rapid that the procedure of FIG. 5 cannot be performed to build a new hop table. This is the purpose of having two hop tables, primary 101 and secondary 102, in the master station and two corresponding hop tables, primary 111 and secondary 102 and 112 are already in existence and are identical, it is only necessary to indicate that hop table interpretation should be changed to use the secondary hop table in order to change the frequency-hopping behavior of both the master station 120 and all slave stations 130.

At the initiation of hop table interpretations, shown in FIG. 4, there is an initialization block 30. This initialization block can be extended to include means for the selection of the primary or secondary hop table for subsequent interpretation. The command to perform this selection is START HOP CLOCK PRIMARY/SECONDARY, which will be described later.

The means by which the simultaneous switchover from master primary hop table 101 to master secondary hop table 102 and from slave primary hop table 111 to slave secondary hop table 112 is accomplished will not be described. This means depends on the definition of a special control message, communicated from the data processing system of the master station 120 to the data processing system of the slave station 130. This control message specifies that upon the execution of step 36 of FIG. 4, which begins hop table interpretation with the first entry, the data communications controller 3 must issue the command "START HOP CLOCK SECONDARY" for example to cause the controller 10 to begin interpreting the secondary hop table 112 rather than to continue interpreting the primary hop table 111.

It is not sufficient that the hopping sequence represented by a hop table be correct, and be a duplicate of the hop table in another instance of the system of FIG. 1. In order for two instances of the system of FIG. 1 to communicate, their respective radio controllers must initiate the use of exactly the same hop table entry at exactly the same time. Otherwise, the receiver of one instance might be tuned to a carrier frequency different from the transmitter of a second instance, the latter attempting to send a message to the former. The processes represented in FIG. 4 must be performed in exact synchronism in all instances of the system of FIG. 1.

One technique for attaining synchronism is to designate one instance as a master, and arrange that the master instance send a single broadcast message to all other instances. The time at which the master sends the broadcast message is arranged to have a precise relationship to the time at which the master instance's hop clock ticks (this time is identified as the execution of the step shown at block 32 of FIG. 4).

Because the radio 5 cannot interpret the contents of a message by assumption, the time of arrival of the broadcast message from the master instance can only be determined by the data communications controller 3, but the hop clock (and hop table interpretation) resides in the radio controller 10. It will now be described how the data communication controller 3 starts or corrects the hop clock in the radio controller 10 so that it is in synchronism with the hop clock of the master instance, and by implication, with the hop clocks of all other instances. The starting and correction of the hop clock is carried out through the transmission and execution of the seven commands detailed below.

READ TIMINGS (TIMINGS)

This command causes the radio controller 10 to return certain critical timing parameters to the data communications controller 3. These timings are used by the data communications controller 3 to compensate for command execution delays in the radio controller 10.

START HOP CLOCK PRIMARY/SECONDARY

This command causes the radio controller 10 to begin executing the procedure of FIG. 4 at the step shown at block 32 with the designated hop table.

STOP HOP CLOCK

This command causes the radio controller 10 to stop executing the procedure of FIG. 4.

MODIFY HOP CLOCK (amount)

This command causes the radio controller 10 to modify the duration of the timer on which the step shown at block 37 of FIG. 4 is waiting.

NOTIFY CLOCK (amount)

This command causes the radio controller 10 to return to the residual duration of the timer on which the step shown at block 37 of FIG. 4 is waiting.

SET NOTIFY HOP ADVANCE (amount)

This command causes the radio controller 10 to set a variable used subsequently in the execution of the NOTIFY HOP command.

NOTIFY HOP (dummy)

This command causes the radio controller 10 to wait until the timer on which the step shown at block 37 of FIG. 4 is waiting reaches the value set by SET NOTIFY HOP ADVANCE. At this time the radio controller 10 returns a dummy response to the data communications controller 3.

The hop clock is started and stopped through the execution of the commands START HOP CLOCK PRIMARY/SECONDARY and STOP HOP CLOCK, respectively. The MODIFY HOP CLOCK command is used to change the instant at which the hop clock ticks, and the NOTIFY CLOCK, NOTIFY HOP, and SET NOTIFY HOP ADVANCE commands provide information to the data communications controller 3 about the time remaining until the hop clock ticks.

The READ TIMINGS command can return the execution time of the START HOP CLOCK command so that the command can be issued early. For example, suppose that it is desired to start hopping at exactly T0, and that the READ TIMINGS command has determined that START HOP CLOCK delays a time duration TK before starting the hop clock. Then the data communications controller 3 should issue the START HOP CLOCK command at a time T0-TK.

The use of the seven commands described above can be illustrated by an example. During system initialization, the data communications controller 3 of the slave system sends a READ TIMINGS command to its radio controller 10, which responds with an estimate of the execution delay of the NOTIFY HOP command TN and NOTIFY CLOCK command TC, among other estimates. Then the data communications controller 3 builds a hop table in the radio controller 10 and uses the START HOP CLOCK command to start the radio hopping. Suppose that the hop tables in the master and one slave instance of the system of FIG. 1 are identical, and that the hop clocks of the master and the slave are approximately in synchronization.

Figure 6A:
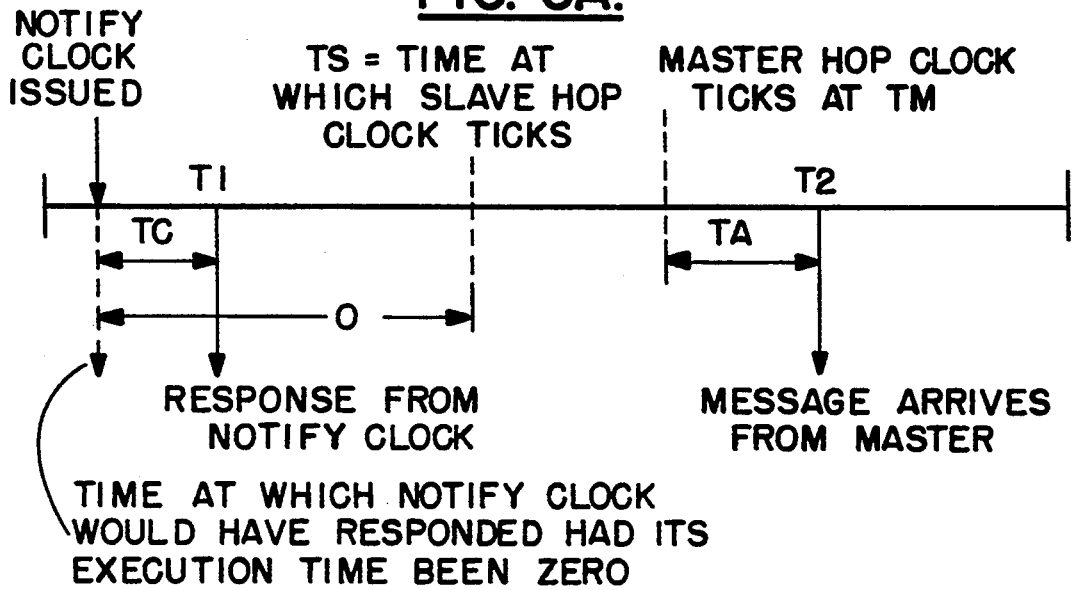

In order now to synchronize the hop clocks of the master and the slave exactly, the hop clock in the slave must be advanced or delayed. FIG. 6a summarizes the timing situation. The data communications controller 3 in the slave sends the command NOTIFY CLOCK to the radio controller 10. The radio controller 10 then returns the time to its hop clock tick (step shown at block 32 of FIG. 4) as 0. The data communications controller 3 notes the time of arrival of the response to NOTIFY CLOCK as T1 and estimates the time at which the radio controller 10 hop clock will tick as TS=T1+O−TC.

The data communications controller 3 then awaits the arrival of the broadcast message from the master instance, and notes that time as T2. Through means not shown all slave instances have knowledge of the time from a tick of the master instance hop clock and the time of the arrival of the broadcast message, TA. Propagation time for the broadcast message can be ignored in environments where the maximum distance from the master to any slave is short. The data communications controller 3 estimates the time TM at which the master clock ticks as $T2-TA$. The data communications controller 3 then calculates the offset between the master instance hop clock and its own radio controller hop clock as $TM-TS=(T2-TA)-(T1+O-TC)$. This is the amount by which the radio controller hop clock must be adjusted so as to be in precise synchronism with the master hop clock. This amount is sent to the radio controller 10 as the argument of the MODIFY HOP CLOCK command.

It may be the case that the data communications controller 3 has periods of intense processing activity and periods of less intense activity, these periods correlating roughly with the radio controller 10 hop clock. For example, the data communications controller will be especially busy just at and after the arrival of the broadcast message from the master instance, because it must record the time of arrival of that message, and analyze it to determine that it is indeed a broadcast message from the master instance. It will therefore be desirable to schedule the processing necessary to correct the radio controller 10, hop clock so as not to coincide with these busy periods. For this purpose, the pair of commands NOTIFY HOP and SET NOTIFY HOP ADVANCE are defined. SET NOTIFY HOP ADVANCE offsets the time at which the hop clock tick notification is sent to the data communications controller. The amount of the offset is controlled by the SET NOTIFY HOP ADVANCE command.

Refer now to FIG. 6b. Suppose that READ TIMINGS has determined that the execution time of NOTIFY HOP is TN. In the example above, the data communications controller 3 estimates a time at which its processing load will not be intense, and uses the difference between that time and the time of arrival of a broadcast message as the argument A of SET NOTIFY HOP ADVANCE. Now the data communications controller would issue the NOTIFY HOP command. The time at which the dummy argument of the NOTIFY HOP command arrives T1 is offset from the time at which the hop clock ticks in the radio controller 10 by the amount $A-TN$. Thus the data communications controller 3 estimates the time at which the radio controller 10 hop clock will tick as $TS=T1+A-TN$. The data communications controller 3 then waits for the arrival of the broadcast message from the master instance, recording that time as T2. The time at which the master instance hop clock ticks is estimated as $TM=T2-TA$. Thus the correction to be applied to the hop clock of the radio controller 10 must be $TM-TS=(T2-TA)-(T1+A-TN)$, and this value is then sent to the radio controller 10 as the argument of the MODIFY HOP CLOCK command.

If there is variability in the transmission and execution of the various commands, this variability can lead to the procedures above continuously correcting the radio controller 10 hop clock. In the radio, this is referred to as "clock jitter." Clock jitter can be minimized by taking multiple observations and averaging them. In the example for NOTIFY HOP above, clock jitter can be minimized by the data communications controller 3 making several successive measurements of $TM-TS$, adding them, and dividing by the number of measurements.

An alternate procedure for correcting the hop clock of the radio controller 10 involves the use of the START HOP CLOCK and STOP HOP CLOCK commands, rather than the MODIFY HOP CLOCK command. An estimate of the timing offset $TM-TS$ is first obtained as illustrated above. When the data communications controller 3 waits for the hop clock to tick (using NOTIFY CLOCK or NOTIFY HOP as above, correcting for their execution times), sends the STOP HOP CLOCK command, waits precisely the time duration $TM-TS$, and sends the START HOP CLOCK PRIMARY/SECONDARY command. This has the effect of modifying the hop clock in the same manner as the MODIFY HOP CLOCK command. This procedure is not preferred, as it increases the processing requirement in the data communications controller 10, and is vulnerable to variability in the wait and in the command issuance processes.

What has been described is a method for synchronizing the hop clock of a remote radio unit and the hop clock of a data communications controller by a series of commands that corrects the parameters of the hop clock of the radio unit.

While the invention has been described in connection with a preferred embodiment, it is not intended to limit the scope of the invention to the particular form set forth, but, on the contrary, it is intended to cover such alternatives, modifications, and equivalence as may be included within the spirit of the scope of the invention as defined in the appended claims.

We claim:

1. In a slow frequency hopping radio communications system of the type including a data communications controller having a hop clock and a hop table that incorporates carrier frequency data, duration data and length data and at least one remote radio unit connected to said data communications controller by an interface, said at least one remote radio unit including a radio controller means therein, transmitter means, and receiver means having a hop clock and a hop table that incorporates carrier frequency data, duration data and length data, a method for generating command signals to synchronize the said hop clocks of said data communications controller and said at least one remote radio unit comprising the steps of:

Step 1: transmitting command signals from said data communications controller to said radio controller means in said at least one remote radio unit to modify the hop table of said radio controller means in said at least one remote radio unit to make said hop table of said radio controller means in said at least one remote radio unit identical to the hop table of said data communications controller, Step 2: transmitting a START HOP CLOCK command signal from said data communications controller to said radio controller means of said at least one remote radio unit to make the radio controller means in said at least one remote radio unit set the carrier frequency of the radio controller means to that of a designated hop table entry and to start the hop clock of the radio controller means in said at least one remote radio unit, Step 3: transmitting a MODIFY HOP CLOCK command signal from said data communications controller to said radio controller means in said at least one remote radio unit to modify the duration of a hop as determined by the current hop table entry of said radio controller means on said at least one remote radio unit to have the same duration of the hop clock of said data communications controller, and Step 4: transmitting a NOTIFY HOP signal from said data communications controller means in said at least one remote radio unit to said radio controller to cause said radio controller means in said at least one remote radio unit to generate an information signal for said data communications controller indicative of the difference in synchronism between said hop clock of said data communications controller and said hop clock of said radio controller means in said at least one remote radio unit.

2. In a slow frequency hopping radio communications system of the type according to claim 1, wherein step 1 of the method for generating command signals according to claim 1 for modifying said hop, table of said radio controller meads in said at least one remote radio unit includes the steps of:

Step 1A: transmitting a SET HOP TABLE ENTRY command Signal from said data communications controller to said radio controller means in said at least one remote radio unit to update said hop table thereof, said HOP TABLE ENTRY including an ENTRY NUMBER designating the index number of the correct hop in said data communication controller hop table, Step 2A: transmitting a SET HOP TABLE LENGTH command signal from said data communications controller to said radio controller means in said at least one remote radio unit to set the length field of the radio controller hop table.

3. In a slow frequency hopping radio communications system at the type according to claim 2, the Step 1 for modifying said hop table of said radio controller means in said at least one remote radio unit further includes:

Step 3A: generating a VALIDATE HOP TABLE command signal from said data communications controller means in said at least one remote radio unit to said radio controller to check the correctness of the hop table of the radio controller means in said at least one remote radio unit.

4. In a slow frequency hopping radio communications system of the type according to claim 3 wherein said data communications controller includes a primary and a second hop table and said at least one remote radio unit includes a primary and secondary hop table.

5. In a slow frequency hopping radio communications system of the type according to claim 4 wherein said step 1A includes transmitting a SET PRIMARY/SECONDARY HOP TABLE ENTRY command signal from said data communications controller to said radio controller means in said at least one remote radio unit to update said primary and secondary hop tables thereof, said PRIMARY/SECONDARY HOP TABLE ENTRY including an ENTRY NUMBER designating the index number of the correct hop in said data communication controller hop table, and wherein said Step 2A includes transmitting a SET PRIMARY/SECONDARY HOP TABLE LENGTH command signal from said data communications controller to said radio controller means in said at least one remote radio unit to set the length field of the radio controller means in said at least one remote radio unit primary and secondary hop tables.

6. In a slow frequency hopping radio communications system at the type according to claim 5, wherein said Step 3A includes generating a VALIDATE PRIMARY/SECONDARY HOP TABLE command signal from said data communications controller to said radio controller means in said at least one remote radio unit to check the correctness of the radio controller hop table.

7. In a slow frequency hopping radio communications system of the type according to claim 1, the Step 2 including transmitting a READ TIMINGS command signal to said radio controller means in said at least one remote radio unit by said data communications controller prior to said START HOP CLOCK command, said READ TIMINGS command signal causing said radio controller means on said at least one remote radio unit to send timing parameters of said radio controller means in said at least one remote radio unit to said data communications controller to compensate for command signal executions delays in said radio controller means in said at least one remote radio unit.

8. In a slow frequency hopping radio communications system of the type according to claim 7 the Step 2 further including transmitting a STOP HOP CLOCK command signal to stop the hop clock of the radio controller means in said at least one remote radio unit.

9. In a slow frequency hopping radio communications system of the type according to claim 7 the Step 3 further includes transmitting a NOTIFY CLOCK command signal after said MODIFY HOP CLOCK command signal is transmitted, said NOTIFY CLOCK command signal causing said radio controller means in said at least one remote radio unit to return the remaining duration of the hop signal of said data communication controller.

10. In a slow frequency hopping radio communications system of the type according to claim 7 wherein step 3 further includes transmitting a NOTIFY HOP command signal and a SET NOTIFY HOP ADVANCE command signal to offset the time of the NOTIFY CLOCK command signal notification.

11. In a slow frequency hopping radio communications system of the type according to claim 10 wherein said offset time of the NOTIFY CLOCK command signal is TM minus TS where TM is the time at which the said data communications hop clock ticks and TS is the time at which the hop clock of said radio controller means in said at least one remote radio unit ticks and wherein step 3 further includes the step of making several successive measurements of (TM−TS) and selecting their average value.

* * * * *